United States Patent [19]

Johnson et al.

[11] 4,240,693
[45] Dec. 23, 1980

[54] ELECTRO-OPTICAL DEVICE BASED ON ELECTROPLATING ACTION

[75] Inventors: Leo F. Johnson, Bedminster; Shobha Singh, Summit; LeGrand G. Van Uitert, Morris Township, Morris County, all of N.J.

[73] Assignee: Bell Telephone Laboratories, Incorporated, Murray Hill, N.J.

[21] Appl. No.: 973,188

[22] Filed: Dec. 26, 1978

[51] Int. Cl.³ ............... G02B 5/14; G09F 9/00; G02F 1/29
[52] U.S. Cl. ............... 350/96.14; 340/763; 340/783; 350/363
[58] Field of Search ............... 350/96.12, 96.13, 96.14, 350/96.29, 96.32, 357, 363; 340/380, 763, 783, 785, 787, 788, 795

[56] References Cited

U.S. PATENT DOCUMENTS

| | | | |
|---|---|---|---|
| 3,153,113 | 10/1964 | Flanagan et al. | 350/363 |
| 3,190,177 | 6/1965 | Kaprelian | 350/363 |
| 3,291,551 | 12/1966 | Zaromb | 350/363 |
| 3,589,794 | 6/1971 | Marcatili | 350/96.14 |
| 3,712,709 | 1/1973 | Kenworthy | 350/363 |
| 3,770,339 | 11/1973 | Ramaswamy | 350/96.29 |
| 3,781,081 | 12/1973 | Rokos | 350/96.14 |
| 3,870,397 | 3/1975 | Dillon, Jr. et al. | 350/96.13 |
| 3,874,779 | 4/1975 | Thiel | 350/96.16 |
| 3,883,220 | 5/1975 | Taylor | 350/96.14 |
| 3,909,108 | 9/1975 | Taylor | 350/96.14 |
| 3,918,794 | 11/1975 | Milton | 350/96.16 |
| 3,964,819 | 6/1976 | Auracher | 350/96.14 |
| 4,013,000 | 3/1977 | Kogelnik | 350/96.13 |
| 4,026,632 | 5/1977 | Hill et al. | 350/96.14 |
| 4,027,946 | 6/1977 | Tsai | 350/96.14 |
| 4,070,092 | 1/1978 | Burns | 350/96.14 |

*Primary Examiner*—Stewart J. Levy
*Attorney, Agent, or Firm*—Peter A. Businger; Peter V. D. Wilde

[57] ABSTRACT

Electrically activated optical switches, couplers, and modulators are disclosed which can be incorporated in waveguide networks in optical communications systems. Disclosed devices comprise an electroplating medium in combination with a suitable source of an electric field whose strength can be varied to cause transition of the electroplating medium between plated and unplated states. Changes of reflectivity and refractive index are the bases of switching and coupling applications, respectively.

2 Claims, 7 Drawing Figures

4,240,693

ELECTRO-OPTICAL DEVICE BASED ON ELECTROPLATING ACTION

TECHNICAL FIELD

The invention is concerned with communications systems utilizing visible or near-visible electromagnetic radiation as message carrier.

BACKGROUND OF THE INVENTION

The availability of sources of coherent electromagnetic radiation at wavelengths in the range of 0.5–5 micrometers and of waveguides for transmitting such radiation have produced widespread interest in the use of light as communications medium. Proposed optical communications systems may comprise light sources, optical waveguides, couplers between light sources and waveguides, and active components such as modulators, deflectors, and switches. Waveguides typically are of a type known as optical fibers or else are patterned transparent films on a substrate. Active components may be integrated with optical fibers as shown in U.S. Pat. No. 3,770,339 (issued Nov. 6, 1973 to V. Ramaswamy) which discloses a device for modulating the intensity of light traveling in an optical fiber by varying an electrical voltage applied to electrodes which are placed circumferentially around the fiber. Another electro-optic device suitable for use with fibers is shown in U.S. Pat. No. 3,918,794 (issued Nov. 11, 1975 to A. F. Milton) which discloses the use of liquid crystal materials for diverting light traveling in optical fibers. Additional devices intended for use with optical fibers are the mechanical and hydraulic deflectors disclosed in U.S. Pat. No. 3,874,779 (issued Apr. 1, 1975 to F. L. Thiel).

Active components have also been disclosed integral to thin film devices; e.g., U.S. Pat. Nos. 3,883,220 (issued May 13, 1975 to H. F. Taylor) and 4,070,092 (issued Jan. 24, 1978 to W. K. Burns) disclose electro-optic devices in which light travels in crystalline thin films. In response to a voltage applied to electrodes disposed on such films, a local change in refractive index is produced in the film, thereby affecting the direction of light propagating in the film.

Electrically controlled coupling of light between parallel waveguides in thin films is disclosed in U.S. Pat. Nos. 3,589,794 (issued June 24, 1971 to E. A. J. Marcatili), 3,781,081 (issued Dec. 25, 1973 to G. H. S. Rokos), 4,026,632 (issued May 31, 1977 to K. O. Hill), 3,909,108 (issued Sept. 30, 1978 H. F. Taylor), and 3,964,819 (issued June 22, 1976 to F. Auracher).

In addition to electro-optic devices as referred to above, devices have been proposed for deflecting light traveling in thin films by acoustical and magnetic means. Instances of such devices are disclosed, respectively, in U.S. Pat. Nos. 4,027,946 (issued June 7, 1977 to C. S. Tsai) and 3,870,398 (issued Mar. 11, 1975 to J. F. Dillon). Moreover, coupling of light between thin film waveguides may be effected acoustically, magnetically, or by piezoelectrically induced mechanical motion of grating couplers as disclosed in U.S. Pat. No. 4,013,000 (issued Mar. 22, 1977 to H. W. Kogelnik).

In spite of longstanding recognition of the feasability of optical communications as discussed, e.g., by Stewart E. Miller, "Integrated Optics: An Introduction", *Bell System Technical Journal*, Volume 48, Number 7 (September 1969) and notwithstanding the variety of components disclosed in patents cited above, the search continues for reliable, commercially viable optical components which are readily combined into integrated systems. In particular, there is a need for active components such as switches and modulators which can be integrated into systems based on light propagating in amorphous and polycrystalline waveguides. One answer to this need is disclosed below, another is disclosed in copending U.S. patent application Johnson-Singh-Van Uitert Ser. No. 973,162.

SUMMARY OF THE INVENTION

The invention is an electro-optic device which may serve, e.g., as switch, coupler, or modulator in optical systems based on crystalline, polycrystalline, or amorphous waveguides. The device comprises two optical waveguides and an electroplating medium which may be placed in the light path so as to function as an electrically tuneable reflector or between parallel light paths as an electrically tuneable coupler or modulator element. Tuning is effected by means of a reversible electric field which is placed across the electroplating medium and whose strength is sufficient to cause transition between states of the electroplating medium.

BRIEF DESCRIPTION OF THE DRAWING

In the drawing
FIG. 1 schematically shows a first embodiment of a single- or multi-mode electro-optic switch utilizing an electroplating medium.

DETAILED DESCRIPTION

In accordance with the invention, an electroplating medium is combined with optical waveguides so as to function, e.g., as a light switch, coupler, or modulator. Waveguides may comprise a "core" portion and a surrounding "cladding" portion whose refractive index is less than the refractive index of the core portion. The difference in refractive index between core and cladding portions may be as little as 0.1 percent and the transition between such portions may take the form, e.g., of a discrete interface, of a gradual change in refractive index, or of a number of steps approximating a gradual change. Waveguides may be completely or partially embedded in or supported by a substrate which may also serve as an optical cladding. Cladding may be absent, e.g., where a waveguide is exposed to ambient air or other lower index medium.

The invention is based on electroplating action which occurs in certain electrolytes such as, e.g., solutions of silver halide complexes and which also forms the basis of certain optical display devices as disclosed, e.g., in U.S. Pat. Nos. 3,291,551 (issued Dec. 13, 1966 to S.

Zaromb) and 3,712,709 (issued Jan. 23, 1973 to J. G. Kenworthy). Two aspects of such electroplating action are particularly significant in the present context of optical communications, namely reversible mirror plating which forms the basis of devices shown in FIGS. 1–5 and reversible change of refractive index which forms the basis of devices shown in FIGS. 6 and 7.

Figure 1:
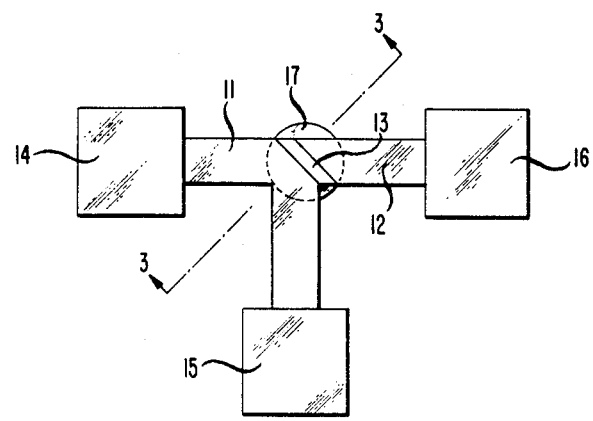

FIG. 1 shows optical waveguides 11 and 12, electroplating medium 13, optical terminals 14, 15 and 16, and electrical contact 17 which partly is exposed and partly underlies electroplating medium 13 and waveguides 11 and 12. Electroplating medium 13 is contained between waveguides 11 and 12 so as to present an essentially planar face at an essentially 45 degree angle to light originating from terminal 14 and propagating in waveguide 11. When electroplating medium 13 is in a plated state, light is primarily deflected at a 90 degree angle towards terminal 15; when electroplating medium 13 is an unplated state, light propagates primarily towards terminal 16. If, e.g., waveguides 11 and 12 comprise a $SiO_2$ cladding having an index of refraction of 1.4585 and a Ge-doped $SiO_2$ core having an index of refraction of approximately 1.48, a suitable electroplating medium 13 may be obtained by dissolving 0.9 grams RbI and 3 grams AgI in 10 milliliter dimethyl formamide (DMF). The resulting electroplating medium, in the unplated state, has a refractive index of 1.48 which closely matches the refractive index of the waveguide core material. Such approximate matching of refractive index between waveguide core material and electroplating medium is generally desirable in devices of FIGS. 1 and 2 for the sake of efficient straight through transmission in the unplated state. In the plated state, the deposited mirror causes virtually complete reflection of light. An alternate electroplating medium, suitable for a waveguide whose core has a refractive index near 1.6 is obtained by dissolving 1.22 grams LiI and 8 grams AgI in 10 milliliter dimethyl sulfoxide (DMSO). The resulting electroplating medium has a refractive index of 1.59 in the non-plated state.

Voltages of approximately 2 volts are appropriate for operating devices utilizing either of the above-mentioned electroplating media which are capable of changing between plated and unplated states in less than one second. In the interest of low operating voltage and fast change of state, halogen silver complexes comprising iodides, bromides, or chlorides are preferred, iodides being particularly suitable in practice. While use of silver compounds is preferred, use of electroplating media containing, e.g., Cd, Sn, Fe, W, Cu, or Zn halides is not precluded. Deflection angles other than 90 degrees may be utilized as may be convenient in the design of integrated optical circuitry.

Figure 2:
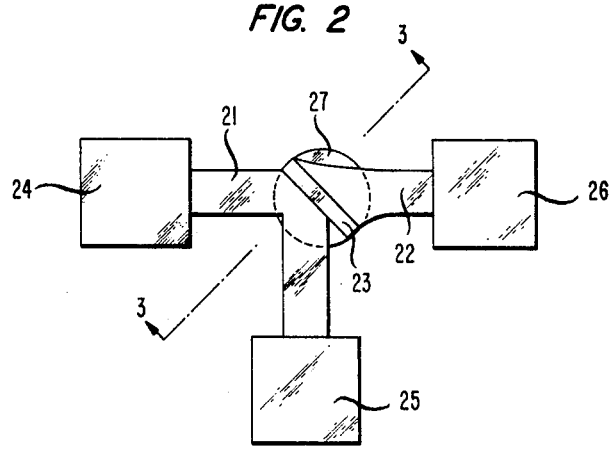
FIG. 2 schematically shows a second embodiment of a single- or multi-mode electro-optic switch utilizing an electroplating medium.

FIG. 2 shows thin film optical waveguides 21 and 22, electroplating medium 23, terminals 24, 25, and 26, and electrical contact 27. Operation of the device of FIG. 2 is the same as that of the device of FIG. 1, the difference lying in enhanced efficiency of light transmission towards terminal 26 on account of the flared shape of waveguide 22.

Figure 3:
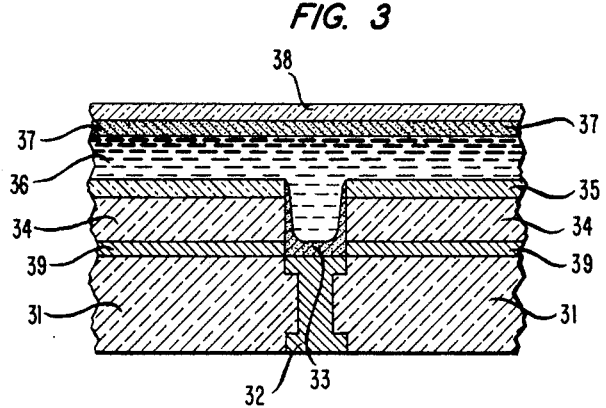
FIG. 3 is an exemplary cross section along line 3—3 of devices shown in FIGS. 1 and 2.

FIG. 3 shows substrate 31, metallic contact 32, contact layer 33, waveguide core layer 34, cladding layers 35 and 39, electroplating medium 36, contact layer 37, and superstrate 38. When a suitable voltage is applied between contact layers 33 and 37, layer 33 becomes plated, when the voltage is reversed the plating disappears. Contact layer 37 may consist of a non-reactive semiconductor material such as e.g., doped $SnO_2$ or indium tin oxide or preferably, of a material containing cations similar to those in the electrolyte. For example, when a silver halide electrolyte is used, layer 37 preferably consists of silver. Alternatively, a compound contact layer may be formed by depositing silver on a layer of indium tin oxide. Yet another approach consists in depositing lithium doped $WO_3$ over a metallic or semiconducting layer. In this case, $li^+$ ions enter the solvent when $Ag°$ is plated out and vice versa, whereby halogen build-up in the solution is minimized.

Figure 4:
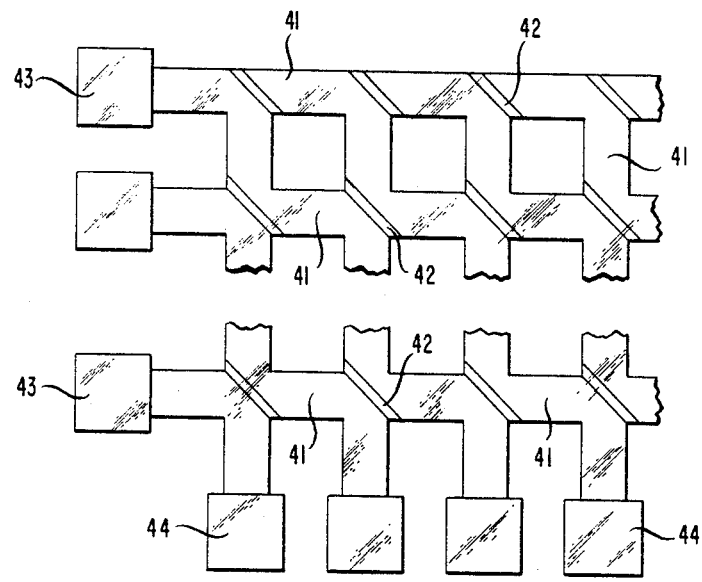
FIG. 4 schematically shows an array of electro-optic switches of a type shown in FIG. 1 and forming an electro-optic crossbar device.

FIG. 4 shows waveguides 41, electroplating media 42, terminals 43, and terminals 44. It can be seen that by producing a plated state in the appropriate medium 42 as described in connection with FIGS. 1–3, an optical path is established from any specific terminal 43 to any specific terminal 44.

Figure 5:
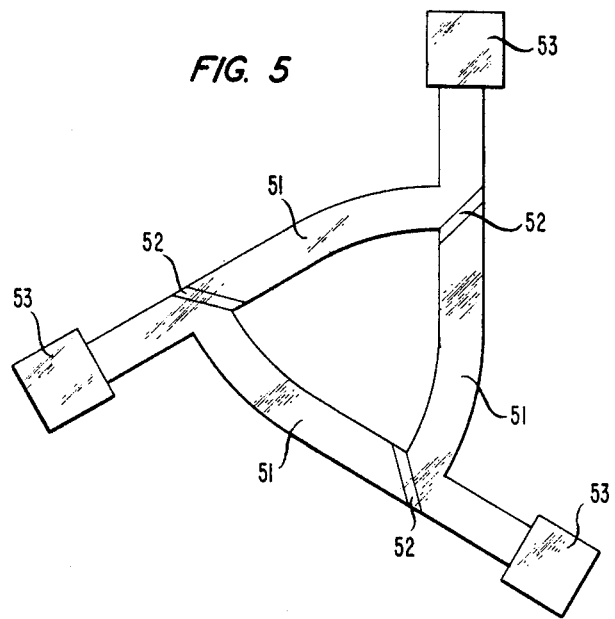
FIG. 5 schematically shows three switches of a type shown in FIG. 1 and arranged to form a fully bidirectional network.

FIG. 5 shows waveguides 51, electroplating media 52, and terminals 53. Waveguides 51 are arranged so as to have components at angles of 90 degrees to permit faces of bodies 52 to be positioned essentially at 45 degree angles relative to the direction of light travelling in waveguides 51. It can be seen that by producing a plated state in the appropriate electroplating medium 52 as described in connection with FIGS. 1–3 and leaving the remaining two in an unplated state, a bidirectional optical path is established between any two terminals 53.

Figure 6:
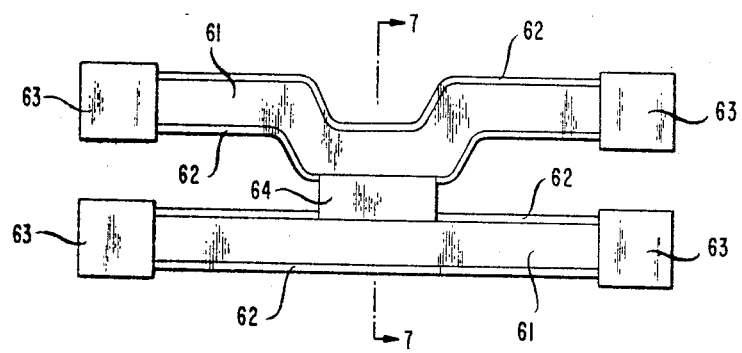
FIG. 6 schematically shows a single mode optical coupler utilizing an electroplating medium.
Figure 7:
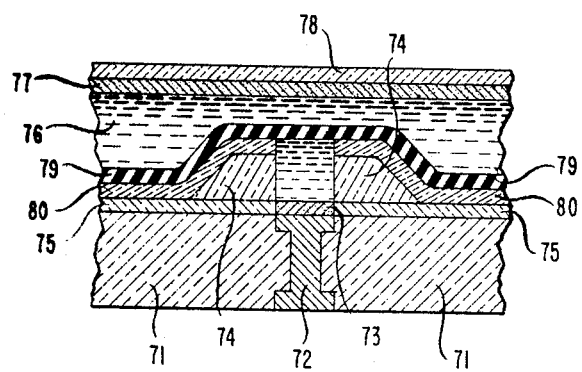
FIG. 7 shows a cross section along line 7—7 of the device shown in FIG. 6.

FIGS. 6 and 7 depict a device which may serve as an optical coupler for laterally coupling light between waveguides. FIG. 6 shows waveguide cores 61 and claddings 62, terminals 63, and electroplating medium 64.

FIG. 7 shows substrate 71, metallic contact 72, contact layer 73, waveguide core layers 74, cladding layers 75 and 80, electroplating medium 76, contact layer 77, superstrate 78, and porous pad 79 which restricts the flow of metal complexes in the electroplating medium into the region between waveguides, yet permits electrical contact. Chemical composition of contact layer 77 may be as specified above for layer 37.

Optical coupling in devices shown in FIGS. 6 and 7 depends on a number of device parameters such as the difference between refractive indices of waveguide core material and electroplating medium, the distance between waveguides, and the length of the coupler. For a fixed geometry, plating onto layer 73 produces a change in refractive index in the volume of medium 76 lying between waveguides and thereby causes a change in coupling between waveguides. For example, waveguides consisting of cores 61 whose index of refraction is $n_1 = 1.5$ and cladding 62 whose index of refraction is $n_2$ 1.49 and having a 3 micrometer square core cross section, allow the propagation of a single well guided mode at a wavelength of 1 micrometer. An electroplating medium 64, suitable for electrically controlled coupling between such waveguides, has a length of 1 cm, a width of 5 micrometers, an index of refraction in the plated state of 1.49, and an index of refraction in the unplated state of 1.493. If cores 61 are placed in contact with such electroplating medium 64 over its entire length of 1 cm, light travelling in one waveguide is virtually completely coupled to the second waveguide when electroplating medium 64 is in the plated state. Conversely, when electroplating medium 64 is in the unplated state, virtually no light is coupled between waveguides.

Changes in refractive index in an electroplating medium even smaller than the change of 0.2 percent in the foregoing example may be used for variable coupling. For example, at a wavelength of 1 micrometer, a single well guided mode propagates in fibers having a 8 micrometer square cross section if $n_1=1.5$ (core) and $n_2=1.499$ (cladding). In this case, a suitable electroplating medium has a length of 1 cm, a width of 8 micrometers, an index of refraction in the plated state of 1.499, and an index of refraction in the unplated state of 1.4996, difference of refractive index between states being merely 0.04 percent.

While in the cases described above, light is transferred between guides when the electroplating medium is in a plated, i.e., lower-index state, devices may be designed whose operation is the converse. For example, an electroplating medium 64, suitable for waveguides having 3 micrometer square core cross section, $n_1=1.5$ (core) and $n_2=1.49$ (cladding), has a width of 5 micrometers, a length of 3 cm, an index of refraction in the plated state of 1.49, and an index of refraction in the unplated state of 1.49175. If waveguide cores 61 are in contact with such medium 64 over its entire length of 3 cm, light is transerred between guides when medium 64 is in the higher index, unplated state. When medium 64 is in the plated state, virtually no light is transferred between guides. Finally, degrees of coupling intermediate to zero and 100 percent may be realized at intermediate values of refractive index corresponding to intermediate degrees of plating. Consequently, electroplating action may be used to modulate light.

Devices of the invention may be conveniently fabricated utilizing techniques such as photolithographical masking, chemical vapor deposition, and ion beam techniques as disclosed by E. G. Spencer and P. H. Schmidt, "Ion Beam Techniques for Device Fabrication", *Journal of Vacuum Science and Technology*, Vol. 8, No. 5, pages S52–S70. The following examples serve to illustrate application of such techniques in the manufacture of devices of the invention.

EXAMPLE 1

Fabrication of a switch as shown in FIGS. 1 and 2 and having a cross section as shown in FIG. 3 is as follows: Into a 2 mm thick fused silica substrate, holes are laser-drilled at intended optical switch locations. Hole diameter is nominally 10 micrometers and may generally be in a preferred range of 1–100 micrometers. Choice of laser used for such drilling is subject to a requirement that laser wavelength be less than the diameter of the hole, $CO_2$, CO, and YAG lasers being suitable, e.g., to drill holes having diameters as small as 10, 5, and 1 micrometers, respectively. Holes are filled with copper by placing the perforated substrate on a copper melt and evacuating the space above the substrate. Copper fillings are pressed after cooling to ensure a tight fit and polished level with the substrate on both sides. Instead of Cu, metals such as, e.g., In, Sn, Au, Ag, or Pt can be used alternatively as filling material. Masking plugs are photolithographically produced over the copper fillings to define a gap having a nominal width of 10 micrometers between waveguides. A 2 micrometer thick cladding layer of $SiO_2$ and a 10 micrometer thick core layer of Ge-doped $SiO_2$ are deposited by sputtering. The desired waveguide pattern is produced by etching in the presence of a photolithographic mask. An additional 2 micrometer thick cladding layer is deposited, masking plugs are removed, and semiconducting doped $SnO_2$ contact layers are evaporated into the gaps in the presence of a mask, semiconducting $SnO_2$ being deposited primarily on the exposed surfaces of copper fillings but also covering to same degree vertical walls of gaps. A mixture of RbI and AgI dissolved in DMF is sealed in the space between waveguide-carrying substrate and a superstrate coated with doped $SnO_2$.

EXAMPLE 2

Fabrication of an optical coupler as shown in FIGS. 6 and 7 starts with the insertion of copper fillings into laser drilled holes as described above in Example 1. To ensure adequate contact to an elongated volume of electroplating medium, it is advantageous to provide several such metallic contacts which may be bridged by a contact layer along the length of the electroplating medium. Such contact layer may consist, e.g., of indium tin oxide, doped $SnO_2$, or gold and is deposited on the copper fillings in the presence of a mask. After stripping of the mask and deposition of a complementary mask, a $SiO_2$ additional cladding layer is deposited. Masking plugs are photolithographically produced over the $SnO_2$ layer to define a gap between waveguides. A Ge-doped $SiO_2$ layer about 10 micrometers thick and having an index of approximately 1.52 is then deposited by sputtering. The desired waveguide pattern, nominally having a coupling length of 1 centimeter and a guide separation of 10 micrometers, is produced by etching in the presence of a photolithographic mask. An additional cladding layer approximately 2 micrometers thick is deposited, masking plugs are removed, and a Teflon filter pad is placed over the manufactured structure. A mixture of, e.g., NaI and AgI dissolved in DMF having an index of refraction of approximately 1.4305 is sealed in the space between such structure and a semiconducting $SnO_2$ coated superstrate.

We claim:

1. Electro-optical device comprising first and second substrate-supported waveguides, said waveguides being essentially parallel for at least a distance, said device comprising coupling means between said waveguides along at least a portion of said distance, said coupling means comprising an electroplating medium which is in contact with said waveguides along said portion, and said coupling means further comprising electrodes for producing an electric field in a direction which is essentially perpendicular to the substrate.

2. Device of claim 1 in which said coupling means comprises a porous pad for restricting a flow of metal complexes in said electroplating medium into a region between said waveguides.

* * * * *